United States Patent
Ishizeki et al.

(10) Patent No.: US 10,926,609 B2
(45) Date of Patent: Feb. 23, 2021

(54) VEHICLE AIR CONDITIONING DEVICE

(71) Applicant: SANDEN AUTOMOTIVE CLIMATE SYSTEMS CORPORATION, Isesaki (JP)

(72) Inventors: Tetsuya Ishizeki, Isesaki (JP); Yuma Yamazaki, Isesaki (JP); Akira Horikoshi, Isesaki (JP); Kohei Yamashita, Isesaki (JP); Ryo Miyakoshi, Isesaki (JP); Megumi Shigeta, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 290 days.

(21) Appl. No.: 16/305,774

(22) PCT Filed: May 11, 2017

(86) PCT No.: PCT/JP2017/018605
§ 371 (c)(1),
(2) Date: Nov. 29, 2018

(87) PCT Pub. No.: WO2017/208834
PCT Pub. Date: Dec. 7, 2017

(65) Prior Publication Data
US 2020/0324623 A1  Oct. 15, 2020

(30) Foreign Application Priority Data
Jun. 2, 2016  (JP) .............................. JP2016-110876

(51) Int. Cl.
*B60H 1/32* (2006.01)
(52) U.S. Cl.
CPC ................................ *B60H 1/3216* (2013.01)

(58) Field of Classification Search
CPC .......... B60H 1/3216; B60H 1/32; B60H 1/22; B60H 1/00978; B60H 2001/3238;
(Continued)

(56) References Cited

U.S. PATENT DOCUMENTS 5,481,884 A  1/1996  Scoccia
2010/0326127 A1*  12/2010  Oomura .................. F25B 41/04
  62/498

(Continued)

FOREIGN PATENT DOCUMENTS

CN  101156033  4/2008
CN  101331370  12/2008

(Continued)

OTHER PUBLICATIONS

Office Action dated May 8, 2020 issued in Chinese Patent Application No. 201780033833.X.
(Continued)

*Primary Examiner* — Emmanuel E Duke
(74) *Attorney, Agent, or Firm* — Cozen O'Connor

(57) ABSTRACT

There is disclosed a vehicle air conditioning device which is capable of judging, as early as possible, refrigerant shortage, for example, due to leakage of refrigerant with elapse of time, and protecting a compressor. The vehicle air conditioning device includes a compressor 2, a radiator 4, an outdoor expansion valve 6, and a heat absorber 9. A control device possesses normal time data indicating a relation between a suction refrigerant temperature Ts and a discharge refrigerant temperature Td of the compressor when a refrigerant circuit R is charged with a sufficient amount of the refrigerant. The control device calculates, from the normal time data, a discharge refrigerant temperature estimated value Tdst at normal time on the basis of the current suction refrigerant temperature Ts, and compares the value and the current discharge refrigerant temperature Td, thereby judging refrigerant shortage of the refrigerant circuit.

12 Claims, 8 Drawing Sheets

(58) Field of Classification Search
CPC ........ B60H 2001/3257; B60H 2500/22; B60H 2500/222; B60H 1/00885; B60H 2001/00142; F25B 49/02; F25B 47/02; F25B 41/046
See application file for complete search history.

(56) References Cited

U.S. PATENT DOCUMENTS

2015/0306939 A1* 10/2015 Miyakoshi ........... B60H 1/3213
62/160
2016/0339767 A1* 11/2016 Enomoto ........... B60H 1/00278

FOREIGN PATENT DOCUMENTS

| CN | 101371087 | 2/2009 |
|---|---|---|
| CN | 104482625 | 4/2015 |
| JP | 55-164793 | 12/1980 |
| JP | 11-211292 | 8/1999 |
| JP | 2000-304388 | 11/2000 |
| JP | 2003-256080 | 9/2003 |
| JP | 2005-207644 | 8/2005 |
| JP | H 03-811153 B2 | 8/2006 |
| JP | 2007-017110 | 1/2007 |
| JP | 2008-249234 | 10/2008 |
| JP | 2009-192090 | 8/2009 |
| JP | 2011-005981 | 1/2011 |
| JP | S 46-55107 B2 | 3/2011 |
| JP | 2012-228945 | 11/2012 |
| JP | 2012-250708 | 12/2012 |
| JP | 2015-92121 | 5/2015 |
| JP | 2016-90177 | 5/2016 |

OTHER PUBLICATIONS

Office Action dated Mar. 10, 2020 issued in Japanese Patent Application No. 2016-110876.

* cited by examiner

VEHICLE AIR CONDITIONING DEVICE

RELATED APPLICATIONS

This is a U.S. National Phase Application under 35 USC 371 of International Application PCT/JP2017/018605 filed on May 11, 2017.

This application claims the priority of Japanese application no. 2016-110876 filed Jun. 2, 2016, the entire content of which is hereby incorporated by reference.

TECHNICAL FIELD

The present invention relates to an air conditioning device of a heat pump system which conditions air of a vehicle interior, and more particularly, it relates to an air conditioning device which is applicable to a hybrid car and an electric vehicle.

BACKGROUND ART

To cope with enhancement of environmental problems in recent years, hybrid cars and electric vehicles have spread. Furthermore, as an air conditioning device which is applicable to such a vehicle, there has been developed a device including a compressor to compress and discharge a refrigerant, a radiator disposed on the side of a vehicle interior to let the refrigerant radiate heat, a heat absorber disposed on the side of the vehicle interior to let the refrigerant absorb heat, an outdoor heat exchanger disposed outside the vehicle interior to let the refrigerant radiate heat or absorb heat, and first and second expansion valves, and there are changed and executed a heating operation of letting the refrigerant discharged from the compressor radiate heat in the radiator, decompressing, through the first expansion valve, the refrigerant from which the heat has been radiated in this radiator and then letting the refrigerant absorb heat in the outdoor heat exchanger, a dehumidifying and heating operation or a dehumidifying and cooling operation of letting the refrigerant discharged from the compressor radiate heat in the radiator and letting the refrigerant from which the heat has been radiated in the radiator absorb heat in the heat absorber, and a cooling operation of letting the refrigerant discharged from the compressor radiate heat in the outdoor heat exchanger, decompressing the refrigerant through the second expansion valve and then letting the refrigerant absorb heat in the heat absorber.

Furthermore, an accumulator is disposed on a refrigerant suction side of the compressor, and the refrigerant is once accumulated in this accumulator to perform gas-liquid separation, and the gas refrigerant is sucked into the compressor, thereby preventing or inhibiting liquid return to the compressor (e.g., see Patent Document 1).

CITATION LIST

Patent Documents

Patent Document 1: Japanese Patent Application Publication No. 2012-228945

SUMMARY OF THE INVENTION

Problems to be Solved by the Invention

Here, a refrigerant gradually leaks from a refrigerant circuit of a vehicle air conditioning device with elapse of time, but heretofore, there has been no choice but to protect and stop a compressor after almost all the refrigerant leaks from the circuit. This also applies to a case where an amount of the refrigerant to be enclosed in the circuit during services or the like is small.

The present invention has been developed to solve such conventional technical problems, and an object thereof is to provide a vehicle air conditioning device which is capable of judging, as early as possible, refrigerant shortage, for example, due to leakage of refrigerant with elapse of time, and protecting a compressor.

Means for Solving the Problems

A vehicle air conditioning device of the invention of claim 1 includes a refrigerant circuit having a compressor to compress a refrigerant, a radiator to let the refrigerant radiate heat, a pressure reducing unit, and a heat absorber to let the refrigerant absorb heat, thereby conditioning air of a vehicle interior, and the vehicle air conditioning device includes a control device to control the compressor, and is characterized in that this control device possesses normal time data indicating a relation between a suction refrigerant temperature Ts and a discharge refrigerant temperature Td of the compressor at normal time when the refrigerant circuit is charged with a sufficient amount of the refrigerant, and the control device calculates, from this normal time data, a discharge refrigerant temperature estimated value Tdst that is the estimated value of the discharge refrigerant temperature Td at the normal time on the basis of the current suction refrigerant temperature Ts, and compares this discharge refrigerant temperature estimated value Tdst and the current discharge refrigerant temperature Td, thereby judging refrigerant shortage of the refrigerant circuit.

The vehicle air conditioning device of the invention of claim 2 is characterized in that in the above invention, the normal time data is data indicating a relation of the suction refrigerant temperature Ts and a discharge refrigerant pressure Pd of the compressor to the discharge refrigerant temperature Td at the normal time when the refrigerant circuit is charged with the sufficient amount of the refrigerant.

The vehicle air conditioning device of the invention of claim 3 is characterized in that in the above respective inventions, the normal time data is a multiple regression equation in which the discharge refrigerant temperature estimated value Tdst is considered as an objective variable, and the suction refrigerant temperature Ts and the discharge refrigerant pressure Pd of the compressor are considered as explanatory variables.

A vehicle air conditioning device of the invention of claim 4 includes a refrigerant circuit having a compressor to compress a refrigerant, a radiator to let the refrigerant radiate heat, a pressure reducing unit, and a heat absorber to let the refrigerant absorb heat, thereby conditioning air of a vehicle interior, and the vehicle air conditioning device includes a control device to control the compressor, and is characterized in that this control device possesses normal time data indicating a relation between a suction refrigerant temperature Ts and a discharge refrigerant pressure Pd of the compressor at normal time when the refrigerant circuit is charged with a sufficient amount of the refrigerant, and the control device calculates, from this normal time data, a discharge refrigerant pressure estimated value Pdst that is the estimated value of the discharge refrigerant pressure Pd at the normal time on the basis of the current suction refrigerant temperature Ts, and compares this discharge refrigerant pressure estimated value Pdst and the current discharge refrigerant pressure Pd, thereby judging refrigerant shortage of the refrigerant circuit.

The vehicle air conditioning device of the invention of claim 5 is characterized in that in the above invention, the normal time data is data indicating a relation of the suction refrigerant temperature Ts and a discharge refrigerant temperature Td of the compressor to the discharge refrigerant pressure Pd at the normal time when the refrigerant circuit is charged with the sufficient amount of the refrigerant.

The vehicle air conditioning device of the invention of claim 6 is characterized in that in the above invention, the normal time data is a multiple regression equation in which the discharge refrigerant pressure estimated value Pdst is considered as an objective variable, and the suction refrigerant temperature Ts and the discharge refrigerant temperature Td of the compressor are considered as explanatory variables.

The vehicle air conditioning device of the invention of claim 7 is characterized in that in the above respective inventions, when it is judged that there is suspicion of the refrigerant shortage of the refrigerant circuit, the control device lowers a capability of the compressor.

The vehicle air conditioning device of the invention of claim 8 is characterized in that in the above invention, the control device lowers the capability of the compressor, and then determines occurrence of the refrigerant shortage of the refrigerant circuit on conditions that a difference between the discharge refrigerant temperature estimated value Tdst and the current discharge refrigerant temperature Td or a difference between the discharge refrigerant pressure estimated value Pdst and the current discharge refrigerant pressure Pd increases.

The vehicle air conditioning device of the invention of claim 9 is characterized in that in the invention of claim 1 to claim 6, when it is judged that there is suspicion of the refrigerant shortage of the refrigerant circuit, the control device narrows down a used bandwith of a number of revolution NC of the compressor, compares, again in this state, the discharge refrigerant temperature estimated value Tdst and the current discharge refrigerant temperature Td or compares the discharge refrigerant pressure estimated value Pdst and the current discharge refrigerant pressure Pd, and determines the occurrence of the refrigerant shortage of the refrigerant circuit.

The vehicle air conditioning device of the invention of claim 10 is characterized in that in the above invention, in a state where the used bandwidth of the number of revolution NC of the compressor is narrowed down, the control device determines the occurrence of the refrigerant shortage of the refrigerant circuit while a difference between the discharge refrigerant temperature estimated value Tdst and the current discharge refrigerant temperature Td or a difference between the discharge refrigerant pressure estimated value Pdst and the current discharge refrigerant pressure Pd is smaller.

The vehicle air conditioning device of the invention of claim 11 is characterized in that in the invention of claim 8 to claim 10, when the occurrence of the refrigerant shortage of the refrigerant circuit is determined, the control device executes a predetermined notifying operation.

The vehicle air conditioning device of the invention of claim 12 is characterized in that in the invention of claim 8 to claim 11, when the occurrence of the refrigerant shortage of the refrigerant circuit is determined, the control device decreases the number of revolution NC of the compressor or stops the compressor.

Advantageous Effect of the Invention

In a vehicle air conditioning device including a refrigerant circuit having a compressor to compress a refrigerant, a radiator to let the refrigerant radiate heat, a pressure reducing unit, and a heat absorber to let the refrigerant absorb heat, thereby conditioning air of a vehicle interior, for example, when the refrigerant gradually leaks from the refrigerant circuit and an amount of the refrigerant in the refrigerant circuit eventually decreases, a suction refrigerant pressure Ps of the compressor lowers. When the suction refrigerant pressure Ps of the compressor lowers, the refrigerant to be sucked into the compressor gains a superheat degree SH.

When the refrigerant to be sucked into the compressor gains the superheat degree SH, a discharge refrigerant temperature Td of the compressor changes so as to rise even at the same suction refrigerant temperature Ts and the same discharge refrigerant pressure Pd of the compressor, and the discharge refrigerant pressure Pd changes so as to lower even at the same suction refrigerant temperature Ts and the same discharge refrigerant temperature Td.

To eliminate the problem, in the invention of claim 1, the control device possesses normal time data indicating a relation between the suction refrigerant temperature Ts and a discharge refrigerant temperature Td of the compressor at normal time when the refrigerant circuit is charged with a sufficient amount of the refrigerant, and the control device calculates, from this normal time data, a discharge refrigerant temperature estimated value Tdst that is the estimated value of the discharge refrigerant temperature Td at the normal time on the basis of the current suction refrigerant temperature Ts, and compares this discharge refrigerant temperature estimated value Tdst and the current discharge refrigerant temperature Td, thereby judging refrigerant shortage of the refrigerant circuit. Consequently, when the refrigerant gradually leaks from the refrigerant circuit or when the amount of the refrigerant enclosed in the refrigerant circuit during services or the like is small, it is possible to detect occurrence of the refrigerant shortage early.

In this case, as in the invention of claim 2, the normal time data is considered as data indicating a relation of the suction refrigerant temperature Ts and the discharge refrigerant pressure Pd of the compressor to the discharge refrigerant temperature Td at the normal time when the refrigerant circuit is charged with the sufficient amount of the refrigerant. Consequently, it is possible to accurately calculate the discharge refrigerant temperature estimated value Tdst.

In particular, as in the invention of claim 3, the normal time data is considered as a multiple regression equation in which the discharge refrigerant temperature estimated value Tdst is considered as an objective variable, and the suction refrigerant temperature Ts and the discharge refrigerant pressure Pd of the compressor are considered as explanatory variables. When the discharge refrigerant temperature estimated value Tdst is obtained from the current suction refrigerant temperature Ts and the discharge refrigerant pressure Pd in the multiple regression equation, it is possible to further accurately calculate the discharge refrigerant temperature estimated value Tdst.

Furthermore, in the invention of claim 4, the control device possesses normal time data indicating a relation between a suction refrigerant temperature Ts and a discharge refrigerant pressure Pd of the compressor at normal time when the refrigerant circuit is charged with a sufficient amount of the refrigerant, and the control device calculates, from this normal time data, a discharge refrigerant pressure estimated value Pdst that is the estimated value of the discharge refrigerant pressure Pd at the normal time on the basis of the current suction refrigerant temperature Ts, and compares this discharge refrigerant pressure estimated value Pdst and the current discharge refrigerant pressure Pd, thereby judging the refrigerant shortage of the refrigerant circuit. Consequently, similarly when the refrigerant gradually leaks from the refrigerant circuit or when the amount of the refrigerant enclosed in the refrigerant circuit during the services or the like is small, it is possible to detect the occurrence of the refrigerant shortage early.

Also in this case, as in the invention of claim 5, the normal time data is considered as data indicating a relation of the suction refrigerant temperature Ts and a discharge refrigerant temperature Td of the compressor to the discharge refrigerant pressure Pd at the normal time when the refrigerant circuit is charged with the sufficient amount of the refrigerant. Consequently, it is possible to accurately calculate the discharge refrigerant pressure estimated value Pdst.

Furthermore, as in the invention of claim 6, the normal time data is considered as a multiple regression equation in which the discharge refrigerant pressure estimated value Pdst is considered as an objective variable, and the suction refrigerant temperature Ts and the discharge refrigerant temperature Td of the compressor are considered as explanatory variables. When the discharge refrigerant pressure estimated value Pdst is obtained from the current suction refrigerant temperature Ts and the discharge refrigerant temperature Td in the multiple regression equation, it is similarly possible to further accurately calculate the discharge refrigerant pressure estimated value Pdst.

Then, as in the invention of claim 7, when it is judged that there is suspicion of the refrigerant shortage of the refrigerant circuit, the control device lowers a capability of the compressor. Consequently, it is possible to perform protection before the compressor rushes into a region where there is possibility of its failure, and it is also possible to notify a user of the suspicion of the refrigerant shortage, while previously avoiding the disadvantage that the compressor is seriously damaged.

In this case, as in the invention of claim 8, the control device lowers the capability of the compressor, and then determines occurrence of the refrigerant shortage of the refrigerant circuit on conditions that a difference between the discharge refrigerant temperature estimated value Tdst and the current discharge refrigerant temperature Td or a difference between the discharge refrigerant pressure estimated value Pdst and the current discharge refrigerant pressure Pd increases. Consequently, it is possible to highly accurately detect the occurrence of the refrigerant shortage of the refrigerant circuit by two stages of judgments.

Furthermore, as in the invention of claim 9, when it is judged that there is suspicion of the refrigerant shortage of the refrigerant circuit, the control device narrows down a used bandwidth of a number of revolution NC of the compressor. Also in this case, it is possible to perform protection before the compressor rushes into a region where there is possibility of its failure, and it is also possible to notify a user of the suspicion of the refrigerant shortage, while previously avoiding the disadvantage that the compressor is seriously damaged.

In particular, in a state where the used bandwidth of the number of revolution NC of the compressor is narrowed down, the control device compares again the discharge refrigerant temperature estimated value Tdst and the current discharge refrigerant temperature Td or compares the discharge refrigerant pressure estimated value Pdst and the current discharge refrigerant pressure Pd, and determines the occurrence of the refrigerant shortage of the refrigerant circuit. Furthermore, as in the invention of claim 10, the control device determines the occurrence of the refrigerant shortage of the refrigerant circuit while a difference between the discharge refrigerant temperature estimated value Tdst and the current discharge refrigerant temperature Td or a difference between the discharge refrigerant pressure estimated value Pdst and the current discharge refrigerant pressure Pd is smaller. Consequently, it is possible to highly accurately and rapidly detect the occurrence of the refrigerant shortage of the refrigerant circuit by two stages of judgments.

Then, as in the invention of claim 11, when the occurrence of the refrigerant shortage of the refrigerant circuit is determined, the control device executes a predetermined notifying operation. Consequently, it is possible to warn the user of the occurrence of the refrigerant shortage, thereby encouraging rapid response.

Furthermore, as in the invention of claim 12, when the occurrence of the refrigerant shortage of the refrigerant circuit is determined, the control device decreases the number of revolution NC of the compressor or stops the compressor. Consequently, it is possible to previously avoid the disadvantage that the compressor is damaged in accordance with the occurrence of the refrigerant shortage of the refrigerant circuit, thereby protecting the compressor.

MODE FOR CARRYING OUT THE INVENTION

Hereinafter, description will be made as to embodiments of the present invention in detail with reference to the drawings.

Embodiment 1

Figure 1:
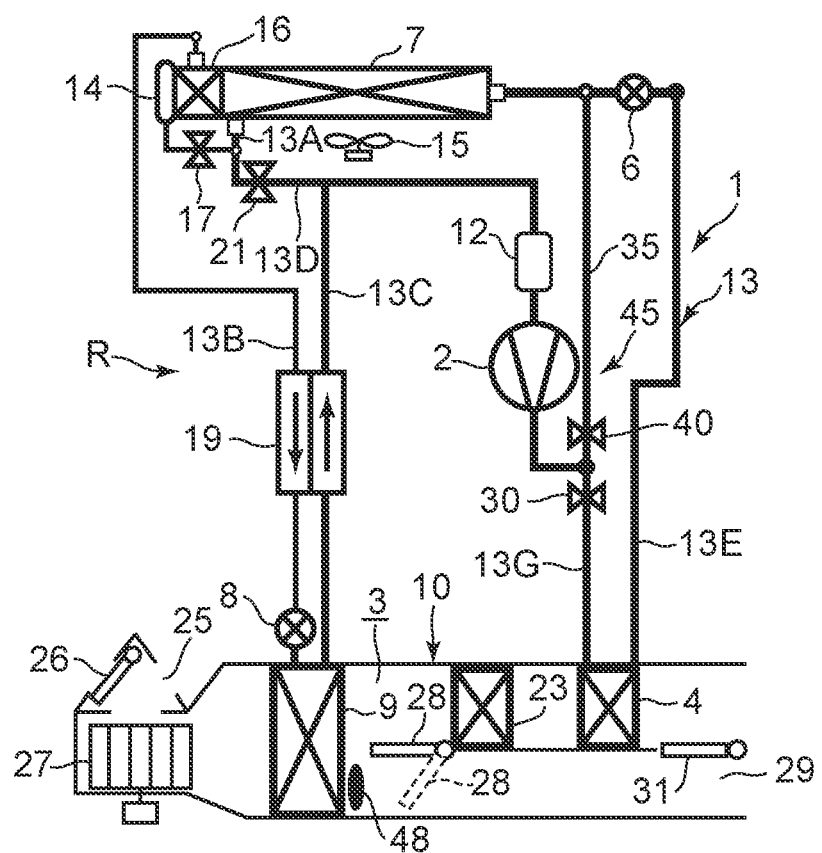
FIG. 1 is a constitutional view of a vehicle air conditioning device of an embodiment to which the present invention is applied (a heating mode, a dehumidifying and heating mode, a dehumidifying and cooling mode, and a cooling mode in Embodiment 1)

FIG. 1 shows a constitutional view of a vehicle air conditioning device 1 of one embodiment of the present invention. A vehicle of the embodiment to which the present invention is applied is an electric vehicle (EV) in which an engine (an internal combustion engine) is not mounted, and runs with an electric motor for running which is driven by power charged in a battery (which is not shown in the drawing), and the vehicle air conditioning device 1 of the present invention is also driven by the power of the battery. Specifically, in the electric vehicle which is not capable of performing heating by engine waste heat, the vehicle air conditioning device 1 of the embodiment performs a heating mode by a heat pump operation in which a refrigerant circuit is used, and furthermore, the conditioning device selectively executes respective operation modes of a dehumidifying and heating mode, a dehumidifying and cooling mode, a cooling mode, and a MAX cooling mode (the maximum cooling mode).

It is to be noted that the vehicle is not limited to the electric vehicle, and the present invention is also effective for a so-called hybrid car in which the engine is used together with the electric motor for running.

Furthermore, needless to say, the present invention is also applicable to a normal car which runs with the engine. The vehicle air conditioning device 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to send inside the high-temperature high-pressure refrigerant discharged from the compressor 2 via a refrigerant pipe 13G and let this refrigerant radiate heat in the vehicle interior, an outdoor expansion valve 6 as a pressure reducing unit constituted of an electric valve which decompresses and expands the refrigerant during the heating, an outdoor heat exchanger 7 which is disposed outside the vehicle interior and performs heat exchange between the refrigerant and outdoor air to function as the radiator during the cooling and to function as an evaporator (a heat absorber) during the heating, an indoor expansion valve 8 as a pressure reducing unit constituted of an electric valve to decompress and expand the refrigerant, a heat absorber 9 disposed in the air flow passage 3 to let the refrigerant absorb heat from interior and exterior of the vehicle during the cooling and during the dehumidifying, an accumulator 12, and others, thereby constituting a refrigerant circuit R.

Furthermore, this refrigerant circuit R is charged with a predetermined amount of refrigerant and a predetermined amount of lubricating oil. It is to be noted that an outdoor blower 15 is provided in the outdoor heat exchanger 7. The outdoor blower 15 forcibly sends the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity is 0 km/h).

Additionally, the outdoor heat exchanger 7 has a receiver drier portion 14 and a subcooling portion 16 successively on a refrigerant downstream side, and a refrigerant pipe 13A extending out from the outdoor heat exchanger 7 is connected to the receiver drier portion 14 via a solenoid valve 17 for cooling which is to be opened in the dehumidifying and heating mode, the dehumidifying and cooling mode, the cooling mode and the MAX cooling mode. A refrigerant pipe 13B on an outlet side of the subcooling portion 16 is connected to an inlet side of the heat absorber 9 via the indoor expansion valve 8. It is to be noted that the receiver drier portion 14 and the subcooling portion 16 structurally constitute a part of the outdoor heat exchanger 7.

In addition, the refrigerant pipe 13B between the subcooling portion 16 and the indoor expansion valve 8 is disposed in a heat exchange relation with a refrigerant pipe 13C on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9.

Furthermore, the refrigerant pipe 13A extending out from the outdoor heat exchanger 7 branches to a refrigerant pipe 13D, and this branching refrigerant pipe 13D communicates and connects with the refrigerant pipe 13C on a downstream side of the internal heat exchanger 19 via a solenoid valve 21 for heating which is to be opened in the heating mode. The refrigerant pipe 13C is connected to the accumulator 12, and the accumulator 12 is connected to a refrigerant suction side of the compressor 2. Additionally, a refrigerant pipe 13E on an outlet side of the radiator 4 is connected to an inlet side of the outdoor heat exchanger 7 via the outdoor expansion valve 6.

In addition, a solenoid valve 30 for reheating which is to be opened in the heating mode, the dehumidifying and cooling mode and the cooling mode and to be closed in the dehumidifying and heating mode and the MAX cooling mode is disposed in the refrigerant pipe 13G between a discharge side of the compressor 2 and an inlet side of the radiator 4. In this case, the refrigerant pipe 13G branches to a bypass pipe 35 on an upstream side of the solenoid valve 30, and this bypass pipe 35 communicates and connects with the refrigerant pipe 13E on a downstream side of the outdoor expansion valve 6 via a solenoid valve 40 for bypass which is to be opened in the dehumidifying and heating mode and the MAX cooling mode and to be closed in the heating mode, the dehumidifying and cooling mode and the cooling mode. The bypass pipe 35, the solenoid valve 30 and the solenoid valve 40 constitute a bypass device 45.

Thus, the bypass pipe 35, the solenoid valve 30 and the solenoid valve 40 constitute the bypass device 45, so that it is possible to smoothly change from the dehumidifying and heating mode or the MAX cooling mode to send, directly into the outdoor heat exchanger 7, the refrigerant discharged from the compressor 2 as described later, to the heating mode, the dehumidifying and cooling mode or the cooling mode to send, into the radiator 4, the refrigerant discharged from the compressor 2.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Additionally, in FIG. 1, reference numeral 23 denotes an auxiliary heater as an auxiliary heating device disposed in the vehicle air conditioning device 1 of the embodiment. The auxiliary heater 23 of the embodiment is constituted of a PTC heater which is an electric heater, and disposed in the air flow passage 3 on an air upstream side of the radiator 4 to the flow of the air in the air flow passage 3. Then, when the auxiliary heater 23 is energized to generate heat, the air in the air flow passage 3 which flows into the radiator 4 through the heat absorber 9 is heated. That is, the auxiliary heater 23 becomes a so-called heater core to perform or complement the heating of the vehicle interior.

Furthermore, in the air flow passage 3 on an air upstream side of the auxiliary heater 23, an air mix damper 28 is disposed to adjust a degree at which the air (the indoor or outdoor air) in the air flow passage 3, flowing into the air flow passage 3 and passed through the heat absorber 9, passes through the auxiliary heater 23 and the radiator 4. Further in the air flow passage 3 on an air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
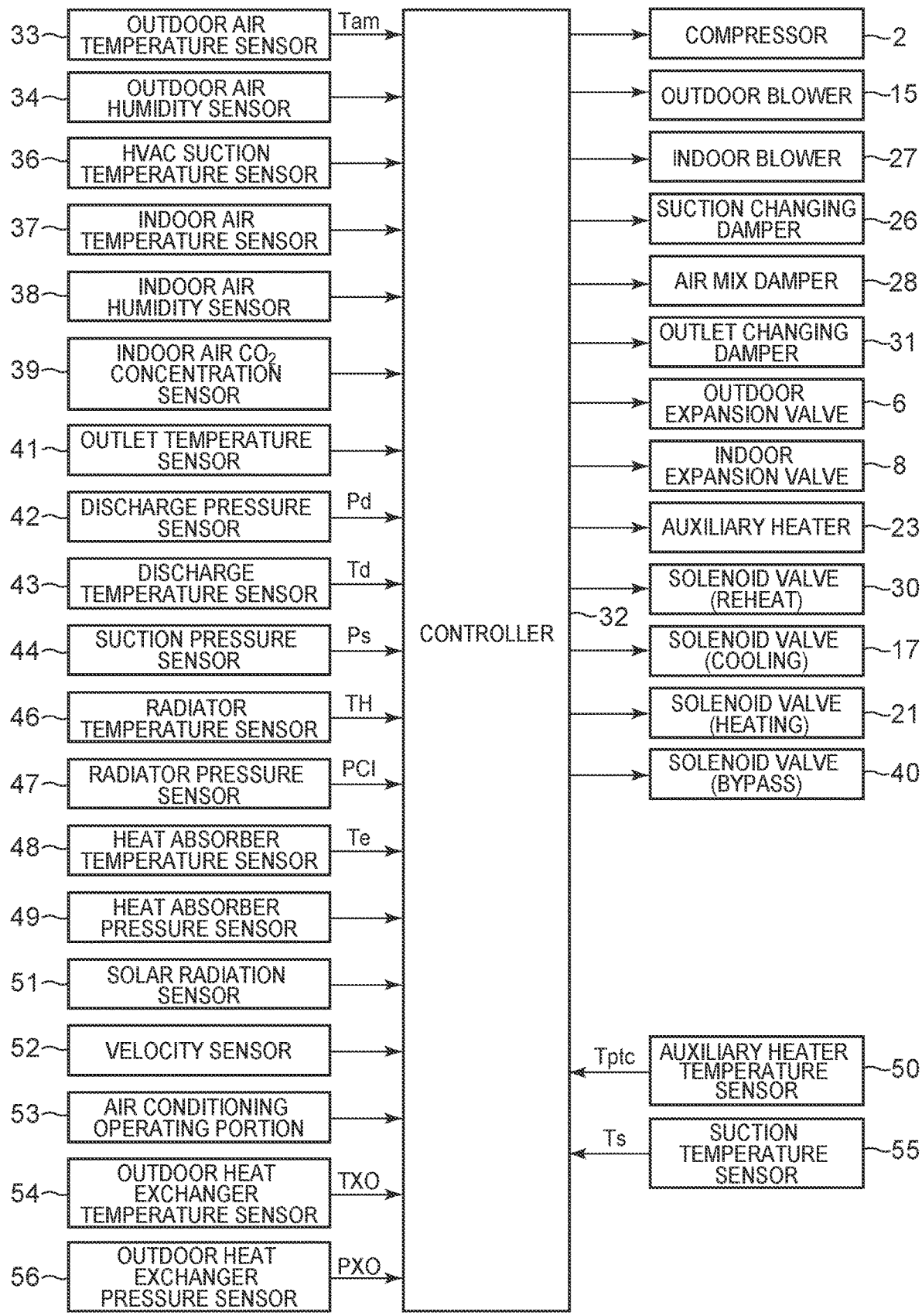
FIG. 2 is a block diagram of an electric circuit of a controller of the vehicle air conditioning device of FIG. 1.

Next, in FIG. 2, reference numeral 32 denotes a controller (ECU) as a control device constituted of a microcomputer which is an example of a computer including a processor, and an input of the controller 32 is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure Pd of the refrigerant discharged from the compressor 2, a discharge temperature sensor 43 which detects a temperature Td of the refrigerant discharged from the compressor 2, a suction pressure sensor 44 which detects a pressure Ps of the refrigerant to be sucked into the compressor 2, a suction temperature sensor 55 which detects a suction refrigerant temperature Ts that is a temperature of the refrigerant flowing out from the accumulator 12 to be sucked into the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the switching between operation modes, an outdoor heat exchanger temperature sensor 54 which detects a temperature of the outdoor heat exchanger 7 (the temperature immediately after the refrigerant flows out from the outdoor heat exchanger 7, or the temperature of the refrigerant flowing into the accumulator 12 in the after-mentioned heating mode: an outdoor heat exchanger temperature TXO), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7: an outdoor heat exchanger pressure PXO). Furthermore, the input of the controller 32 is further connected to an output of an auxiliary heater temperature sensor 50 which detects a temperature of the auxiliary heater 23 (the temperature immediately after the air is heated by the auxiliary heater 23 or the temperature of the auxiliary heater 23 itself: an auxiliary heater temperature Tptc).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the auxiliary heater 23, and the respective solenoid valves, i.e., the solenoid valve 30 (for the reheating), the solenoid valve 17 (for the cooling), the solenoid valve 21 (for the heating) and the solenoid valve 40 (for the bypass). Then, the controller 32 controls these components on the basis of the outputs of the respective sensors and the setting input by the air conditioning operating portion 53.

Next, description will be made as to an operation of the vehicle air conditioning device 1 of the embodiment having the above constitution. In the embodiment, the controller 32 switches between and executes the respective operation modes of the heating mode, the dehumidifying and heating mode, the dehumidifying and cooling mode, the cooling mode and the MAX cooling mode. Description will initially be made as to a flow of the refrigerant and an outline of control in each operation mode.

(1) Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17 (for the cooling). Furthermore, the controller opens the solenoid valve 30 (for the reheating) and closes the solenoid valve 40 (for the bypass).

Then, the controller operates the compressor 2 and the respective blowers 15 and 27, and the air mix damper 28 has a state of sending, to the auxiliary heater 23 and the radiator 4, all the air in the air flow passage 3 that is blown out from the indoor blower 27 and passed through the heat absorber 9 as shown by a broken line in FIG. 1. In consequence, a high-temperature high-pressure gas refrigerant discharged from the compressor 2 flows into the radiator 4 through the solenoid valve 30 and the refrigerant pipe 13G. The air in the air flow passage 3 passes through the radiator 4, and hence the air in the air flow passage 3 heats by the high-temperature refrigerant in the radiator 4 (in the auxiliary heater 23 and the radiator 4, when the auxiliary heater 23 operates), whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump. Then, the low-temperature refrigerant flowing out from the outdoor heat exchanger 7 flows through the refrigerant pipe 13A, the solenoid valve 21 and the refrigerant pipe 13D, and flows from the refrigerant pipe 13C into the accumulator 12 to perform gas-liquid separation therein, and then the gas refrigerant is sucked into the compressor 2, thereby repeating this circulation.

Figure 4:
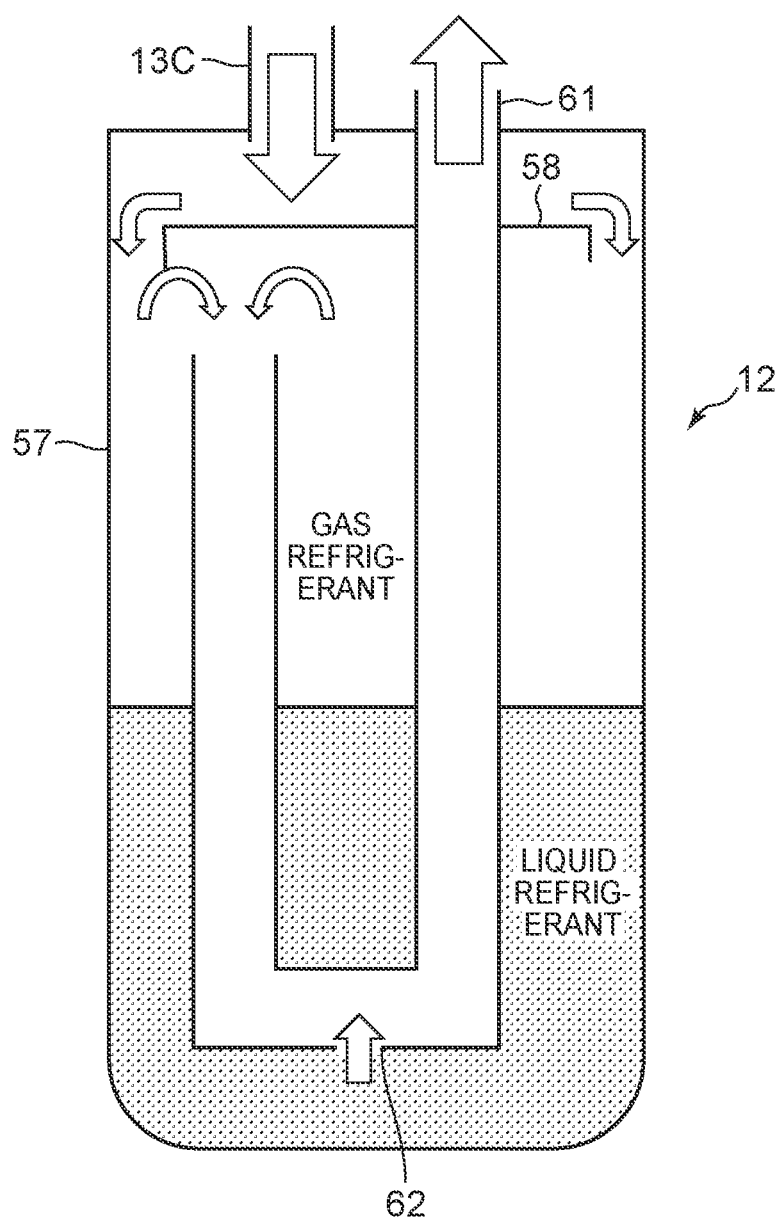
FIG. 4 is a schematic cross-sectional view of an accumulator of the vehicle air conditioning device of FIG. 1.

Here, FIG. 4 shows a cross-sectional view of this accumulator 12. The accumulator 12 is a so-called gas-liquid separator to separate a liquid refrigerant and a gas refrigerant which flow therein through the refrigerant pipe 13C, and the accumulator is constituted of a tank 57 having a predetermined vertical dimension and having a predetermined volume therein, a baffle plate 58 disposed in an upper portion of this tank 57 and disposed away from side walls and a top wall of the tank 57, and an outlet pipe 61 which enters an interior of the tank 57 from the top wall thereof, extends through the baffle plate 58, once lowers down to a bottom portion of the tank 57 and then rises so that its raised distal end opens with a space under the baffle plate 58.

The lowermost portion of the outlet pipe 61 is located with a small space above a bottom wall of the tank 57, and an oil return hole 62 of a small hole is formed in this lowermost portion. Furthermore, an upper end of the outlet pipe 61 extends out from the top wall of the tank 57 and is connected to the suction side of the compressor 2. Then, the refrigerant pipe 13C enters the interior of the tank 57 from the top wall thereof and is open above the baffle plate 58.

As described above, the gas refrigerant evaporated in the outdoor heat exchanger 7 and the unevaporated liquid refrigerant flows through the refrigerant pipe 13A, the solenoid valve 21 and the refrigerant pipe 13D, and flows from the refrigerant pipe 13C into the tank 57 of the accumulator 12 as shown by an arrow in FIG. 4. The refrigerant which has flowed into the tank 57 in a gas and liquid mixed state firstly collides with the baffle plate 58 to spread outwardly, and passes through a space between an outer edge of the baffle plate 58 and the tank 57 to flow downwardly to a lower portion of the tank 57 as shown by arrows.

The liquid refrigerant is accumulated in the lower portion of the tank 57, and the gas refrigerant, as well as the gas refrigerant resulting from the liquid refrigerant evaporated in the accumulator 12, flows through a space between the distal end of the outlet pipe 61 and the baffle plate 58 as shown by an arrow, flows from an opening at the distal end of the outlet pipe 61 to an interior of the outlet pipe 61, flows downwardly, rises again and flows out from the accumulator 12. Further in the tank 57, oil (for lubrication of the compressor 2) circulating in the refrigerant circuit R together with the refrigerant is also accumulated. This oil and a part of the liquid refrigerant enter the interior of the outlet pipe 61 from the oil return hole 62 formed in the lowermost portion of the outlet pipe 61, rise, and flow out from the accumulator 12.

The liquid refrigerant in the refrigerant and oil flowing out from the accumulator 12 as described above absorbs heat from the outside in a process of reaching the compressor 2 to evaporate, and hence the gas refrigerant and oil are only sucked into the compressor 2. The suction temperature sensor 55 detects the temperature of this refrigerant (the suction refrigerant temperature Ts).

The air heated in the radiator 4 (in the auxiliary heater 23 and the radiator 4, when the auxiliary heater 23 operates) is blown out from the outlet 29, thereby performing the heating of the vehicle interior. In this case, the controller 32 calculates a target radiator pressure PCO (a target value of the radiator pressure PCI) from a target radiator temperature TCO (a target value of the radiator temperature TH) calculated from an after-mentioned target outlet temperature TAO, and controls a number of revolution of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller 32 controls a valve position of the outdoor expansion valve 6 on the basis of the temperature (the radiator temperature TH) of the radiator 4 which is detected by the radiator temperature sensor 46 and the radiator pressure PCI detected by the radiator pressure sensor 47, and controls a subcool degree SC of the refrigerant in an outlet of the radiator 4 (which is calculated from the radiator temperature TH and the radiator pressure PCI) to a predetermined target subcool degree TGSC that is a target value of the subcool degree. The target radiator temperature TCO is basically considered as TCO=TAO, but a predetermined limit of controlling is provided.

Furthermore, in this heating mode, when a heating capability by the radiator 4 runs short to a heating capability required for vehicle interior air conditioning, the controller 32 controls the energization of the auxiliary heater 23 to complement the shortage by the heat generation of the auxiliary heater 23. In consequence, comfortable vehicle interior heating is achieved, and frosting of the outdoor heat exchanger 7 is inhibited. At this time, the auxiliary heater 23 is disposed on the air upstream side of the radiator 4, and hence the air flowing through the air flow passage 3 is passed through the auxiliary heater 23 before the radiator 4.

Here, if the auxiliary heater 23 is disposed on the air downstream side of the radiator 4 and when the auxiliary heater 23 is constituted of the PTC heater as in the embodiment, the temperature of the air flowing into the auxiliary heater 23 rises due to the radiator 4. Therefore, a resistance value of the PTC heater increases, and a current value decreases to also decrease an amount of heat to be generated, but the auxiliary heater 23 is disposed on the air upstream side of the radiator 4, so that it is possible to sufficiently exert a capability of the auxiliary heater 23 constituted of the PTC heater as in the embodiment.

(2) Dehumidifying and Heating Mode

Next, in the dehumidifying and heating mode, the controller 32 opens the solenoid valve 17 and closes the solenoid valve 21. Furthermore, the controller closes the solenoid valve 30, opens the solenoid valve 40, and adjusts the valve position of the outdoor expansion valve 6 to a shutoff position. Then, the controller operates the compressor 2 and the respective blowers 15 and 27. As shown by the broken line in FIG. 1, the air mix damper 28 achieves a state of sending, to the auxiliary heater 23 and the radiator 4, all the air in the air flow passage 3 that is blown out from the indoor blower 27 and passed through the heat absorber 9.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed, and then flows into the heat absorber 9 to evaporate. By a heat absorbing operation at this time, the air blown out from the indoor blower 27 is cooled, and water in the air coagulates to adhere to the heat absorber 9. Therefore, the air in the air flow passage 3 is cooled and dehumidified. The refrigerant evaporated in the heat absorber 9 flows through the internal heat exchanger 19 and the refrigerant pipe 13C to reach the accumulator 12 to perform the gas-liquid separation therein as described above, and then the refrigerant is sucked into the compressor 2, thereby repeating this circulation.

At this time, the valve position of the outdoor expansion valve 6 is adjusted to the shutoff position, so that it is possible to inhibit or prevent the disadvantage that the refrigerant discharged from the compressor 2 flows from the outdoor expansion valve 6 back into the radiator 4. Consequently, it is possible to inhibit or eliminate decrease of an amount of the refrigerant to be circulated, thereby acquiring an air conditioning capability. Furthermore, in this dehumidifying and heating mode, the controller 32 energizes the auxiliary heater 23 to generate heat. Consequently, the air cooled and dehumidified in the heat absorber 9 is further heated in a process of passing the auxiliary heater 23, and hence a temperature rises, thereby performing the dehumidifying and heating of the vehicle interior.

The controller 32 controls the number of revolution of the compressor 2 on the basis of the temperature (the heat absorber temperature Te) of the heat absorber 9 which is detected by the heat absorber temperature sensor 48 and a target heat absorber temperature TEO that is a target value of the heat absorber temperature, and the controller controls the energization (the heat generation) of the auxiliary heater 23 on the basis of the auxiliary heater temperature Tptc detected by the auxiliary heater temperature sensor 50 and the above-mentioned target radiator temperature TCO. Consequently, the drop of the temperature of the air blown out from the outlet 29 to the vehicle interior is accurately prevented by the heating of the auxiliary heater 23, while appropriately performing the cooling and dehumidifying of the air in the heat absorber 9.

In consequence, the temperature of the air blown out to the vehicle interior can be controlled at an appropriate heating temperature while dehumidifying the air, and it is possible to achieve comfortable and efficient dehumidifying and heating of the vehicle interior. Furthermore, as described above, in the dehumidifying and heating mode, the air mix damper 28 has a state of sending, through the auxiliary heater 23 and the radiator 4, all the air in the air flow passage 3. Therefore, the air passed through the heat absorber 9 is efficiently heated by the auxiliary heater 23, thereby improving energy saving properties, and controllability of the air conditioning for the dehumidifying and heating can improve.

It is to be noted that the auxiliary heater 23 is disposed on the air upstream side of the radiator 4, and hence the air heated by the auxiliary heater 23 passes through the radiator 4. However, in this dehumidifying and heating mode, the refrigerant does not flow through the radiator 4, and hence it is possible to eliminate the disadvantage that heat is absorbed, by the radiator 4, from the air heated by the auxiliary heater 23. Specifically, it is possible to inhibit the temperature drop of the air blown out to the vehicle interior by the radiator 4, and a coefficient of performance (COP) improves.

(3) Dehumidifying and Cooling Mode

Next, in the dehumidifying and cooling mode, the controller 32 opens the solenoid valve 17 and closes the solenoid valve 21. The controller also opens the solenoid valve 30 and closes the solenoid valve 40. Then, the controller operates the compressor 2 and the respective blowers 15 and 27, and the air mix damper 28 has the state of sending, through the auxiliary heater 23 and the radiator 4, all the air in the air flow passage 3 that is blown out from the indoor blower 27 and passed through the heat absorber 9 as shown by the broken line in FIG. 1. Consequently, the high-temperature high-pressure gas refrigerant discharged from the compressor 2 flows through the solenoid valve 30 and flows from the refrigerant pipe 13G into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19 and the refrigerant pipe 13C and reaches the accumulator 12 to perform the gas-liquid separation therein as described above, and the refrigerant is sucked into the compressor 2, thereby repeating this circulation. In this dehumidifying and cooling mode, the controller 32 does not energize the auxiliary heater 23, and hence the air cooled and dehumidified in the heat absorber 9 is reheated in the process of passing the radiator 4 (a radiation capability during the reheating is lower than that during the heating). Consequently, the dehumidifying and cooling of the vehicle interior is performed.

The controller 32 controls the number of revolution of the compressor 2 on the basis of the temperature of the heat absorber 9 (the heat absorber temperature Te) which is detected by the heat absorber temperature sensor 48, also controls the valve position of the outdoor expansion valve 6 on the basis of the above-mentioned high pressure of the refrigerant circuit R, and controls the refrigerant pressure of the radiator 4 (the radiator pressure PCI).

(4) Cooling Mode

Next, in the cooling mode, the controller 32 adjusts the valve position of the outdoor expansion valve 6 to a fully opened position in the above state of the dehumidifying and cooling mode. It is to be noted that the controller 32 controls the air mix damper 28 to adjust a ratio at which the air in the air flow passage 3, blown out from the indoor blower 27 and passed through the heat absorber 9, passes through the auxiliary heater 23 and the radiator 4 as shown by a solid line in FIG. 1. Furthermore, the controller 32 does not energize the auxiliary heater 23.

In consequence, the high-temperature high-pressure gas refrigerant discharged from the compressor 2 flows through the solenoid valve 30 and flows from the refrigerant pipe 13G into the radiator 4, and the refrigerant flowing out from the radiator 4 flows through the refrigerant pipe 13E to reach the outdoor expansion valve 6. At this time, the outdoor expansion valve 6 is fully opened, and hence the refrigerant passes the outdoor expansion valve to flow into the outdoor heat exchanger 7 as it is, in which the refrigerant is cooled by the running therein or the outdoor air passed through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. The refrigerant is decompressed in the indoor expansion valve 8 and then flows into the heat absorber 9 to evaporate. By the heat absorbing operation at this time, the air blown out from the indoor blower 27 is cooled. Furthermore, the water in the air coagulates to adhere to the heat absorber 9.

The refrigerant evaporated in the heat absorber 9 flows through the internal heat exchanger 19 and the refrigerant pipe 13C and reaches the accumulator 12 to perform the gas-liquid separation therein as described above, and then the refrigerant is sucked into the compressor 2, thereby repeating this circulation. The air cooled and dehumidified in the heat absorber 9 is blown out from the outlet 29 to the vehicle interior (a part of the air passes the radiator 4 to perform heat exchange), thereby performing the cooling of the vehicle interior. In this cooling mode, the controller 32 also controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(5) MAX Cooling Mode (Maximum Cooling Mode)

Figure 3:
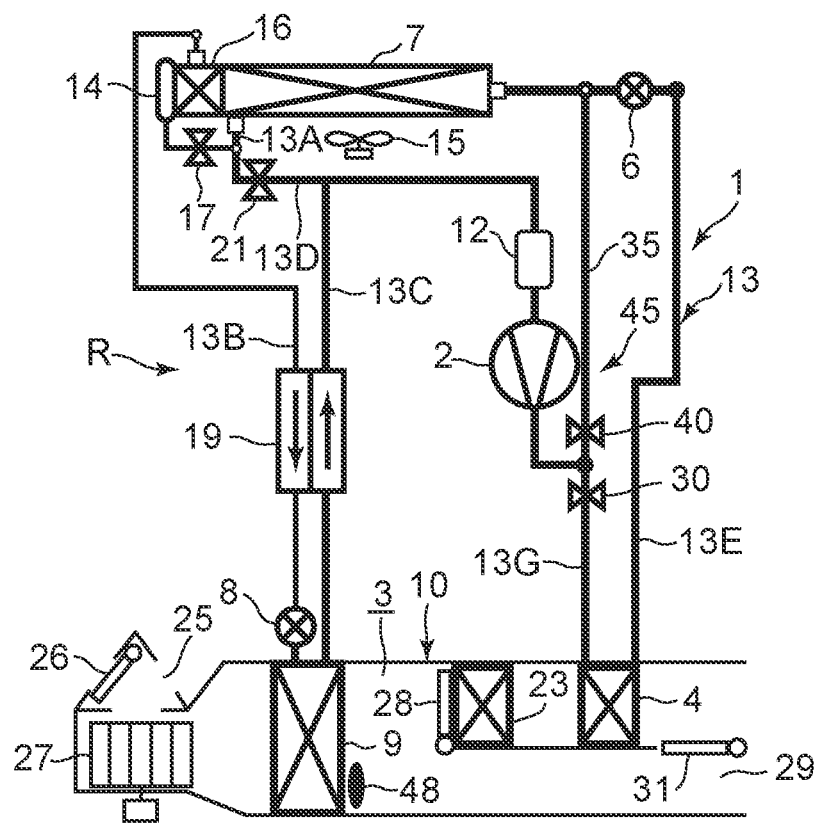
FIG. 3 is a constitutional view when the vehicle air conditioning device of FIG. 1 is in a MAX cooling mode (the maximum cooling mode)

Next, in the MAX cooling mode that is the maximum cooling mode, the controller 32 opens the solenoid valve 17 and closes the solenoid valve 21. The controller also closes the solenoid valve 30, opens the solenoid valve 40, and adjusts the valve position of the outdoor expansion valve 6 to the shutoff position. Then, the controller operates the compressor 2 and the respective blowers 15 and 27, and the air mix damper 28 has a state where the air in the air flow passage 3 does not pass through the auxiliary heater 23 and the radiator 4 as shown in FIG. 3. However, even when the air slightly passes, there are not any problems. Furthermore, the controller 32 does not energize the auxiliary heater 23.

In consequence, the high-temperature high-pressure gas refrigerant discharged from the compressor 2 to the refrigerant pipe 13G flows into the bypass pipe 35 without flowing toward the radiator 4, and flows through the solenoid valve 40 to reach the refrigerant pipe 13E on the downstream side of the outdoor expansion valve 6. At this time, the outdoor expansion valve 6 is shut off, and hence the refrigerant flows into the outdoor heat exchanger 7. The refrigerant flowing into the outdoor heat exchanger 7 is cooled by running therein or the outdoor air passed through the outdoor blower 15, to condense. The refrigerant flowing out from the outdoor heat exchanger 7 flows from the refrigerant pipe 13A through the solenoid valve 17 successively into the receiver drier portion 14 and the subcooling portion 16. Here, the refrigerant is subcooled.

The refrigerant flowing out from the subcooling portion 16 of the outdoor heat exchanger 7 enters the refrigerant pipe 13B and flows through the internal heat exchanger 19 to reach the indoor expansion valve 8. In the indoor expansion valve 8, the refrigerant is decompressed and then flows into the heat absorber 9 to evaporate. By the heat absorbing operation at this time, the air blown out from the indoor blower 27 is cooled. Furthermore, the water in the air coagulates to adhere to the heat absorber 9, and hence the air in the air flow passage 3 is dehumidified. The refrigerant evaporated in the heat absorber 9 flows through the internal heat exchanger 19 and the refrigerant pipe 13C to reach the accumulator 12, and flows therethrough to be sucked into the compressor 2, thereby repeating the circulation. At this time, the outdoor expansion valve 6 is shut off, so that it is similarly possible to inhibit or prevent the disadvantage that the refrigerant discharged from the compressor 2 flows from the outdoor expansion valve 6 back into the radiator 4. Consequently, it is possible to inhibit or eliminate the decrease of the amount of the refrigerant to be circulated, and it is possible to acquire the air conditioning capability.

Here, in the above-mentioned cooling mode, the high-temperature refrigerant flows through the radiator 4, and hence direct heat conduction from the radiator 4 to the HVAC unit 10 considerably occurs, but the refrigerant does not flow through the radiator 4 in this MAX cooling mode. Therefore, the air from the heat absorber 9 in the air flow passage 3 is not heated by heat transmitted from the radiator 4 to the HVAC unit 10. Consequently, powerful cooling of the vehicle interior is performed, and especially under an environment where the outdoor air temperature Tam is high, the vehicle interior can rapidly be cooled to achieve the comfortable air conditioning of the vehicle interior. Also in this MAX cooling mode, the controller 32 controls the number of revolution of the compressor 2 on the basis of the temperature of the heat absorber 9 (the heat absorber temperature Te) which is detected by the heat absorber temperature sensor 48 and the target heat absorber temperature TEO that is the target value of the heat absorber temperature.

(6) Switching Between Respective Operation Modes

The air circulated in the air flow passage 3 is subjected to the cooling from the heat absorber 9 and a heating operation from the radiator 4 (and the auxiliary heater 23) (adjusted by the air mix damper 28) in the above respective operation modes, and the air is blown out from the outlet 29 into the vehicle interior. The controller 32 calculates the target outlet temperature TAO on the basis of the outdoor air temperature Tam detected by the outdoor air temperature sensor 33, the temperature of the vehicle interior which is detected by the indoor air temperature sensor 37, the blower voltage, the solar radiation amount detected by the solar radiation sensor 51 and others, and the target vehicle interior temperature (the predetermined temperature) set in the air conditioning operating portion 53. The controller switches between the respective operation modes, and controls the temperature of the air blown out from the outlet 29 at this target outlet temperature TAO.

In this case, the controller 32 changes the respective operation modes on the basis of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and presence/absence of requirement for the dehumidifying of the vehicle interior. In consequence, the controller accurately switches between the heating mode, the dehumidifying and heating mode, the dehumidifying and cooling mode, the cooling mode and the MAX cooling mode in accordance with environment conditions or necessity for the dehumidifying, thereby achieving comfortable and efficient air conditioning of the vehicle interior.

(7) Judgment of Refrigerant Shortage by Controller 32 (No. 1)

Next, description will be made as to control of judgment of refrigerant shortage of the refrigerant circuit R by the controller 32 with reference to FIG. 5 to FIG. 7. In particular, in the vehicle air conditioning device 1 for use in an environment where there is vibration more than in an environment of a conventional air conditioning device, there is the problem that the refrigerant gradually leaks from the refrigerant circuit R during use with elapse of time. Furthermore, there is also a case where the amount of the refrigerant enclosed in the refrigerant circuit R during services is insufficient. When the amount of the refrigerant in the refrigerant circuit R decreases and becomes insufficient, the compressor 2 is seriously damaged. Therefore, in protection of equipment, it is extremely important to judge occurrence of the refrigerant shortage early.

Here, the refrigerant to be sucked into the compressor 2 is accumulated in the accumulator 12. However, for example, when the refrigerant gradually leaks from the refrigerant circuit R and the amount of the refrigerant in the refrigerant circuit R eventually decreases, or when the amount of the refrigerant enclosed during the services or the like is small and hence the refrigerant in the refrigerant circuit R runs short, the suction refrigerant pressure Ps of the compressor 2 lowers and the amount of the refrigerant accumulated in the accumulator 12 also decreases. When the suction refrigerant pressure Ps of the compressor 2 lowers and the amount of the refrigerant in the accumulator 12 also decreases, the refrigerant to be sucked into the compressor 2 gains the superheat degree SH. When the refrigerant to be sucked into the compressor 2 gains the superheat degree SH, the discharge refrigerant temperature Td changes so as to heighten even at the same suction refrigerant temperature Ts and the same discharge refrigerant pressure Pd, and the discharge refrigerant pressure Pd changes so as to lower even at the same suction refrigerant temperature Ts and the same discharge refrigerant temperature Td.

Next, this behavior will be described with reference to FIG. 5. FIG. 5 is a P-h graph of the refrigerant circuit R, for example, in the above-mentioned heating mode. Furthermore, in this drawing, a line denoted with L1 indicates a case where a sufficient amount of the refrigerant is enclosed in the refrigerant circuit R, and a line denoted with L2 indicates a case where the amount of the refrigerant is insufficient. Additionally, L3 denotes a saturated steam line.

Also as apparent from this drawing, the temperature of the refrigerant in the accumulator 12 is the outdoor heat exchanger temperature TXO (at −5° C. in this example), and the amount of the refrigerant is sufficient. In this case, in a process from when the refrigerant flows out from the accumulator 12 (shown with TXO in FIG. 5) until the refrigerant is sucked into the compressor 2 (shown with Ts in FIG. 5), the temperature drops substantially along the saturated steam line L3, and the suction refrigerant temperature Ts is at −10° C. in this case (Ts of the line L1 in FIG. 5). Then, the discharge refrigerant temperature Td of the refrigerant compressed in the compressor 2 is at about +90° C. (shown with Tdst in FIG. 5).

On the other hand, for example, when the refrigerant gradually leaks from the refrigerant circuit R and the amount of the refrigerant becomes insufficient, the amount of the liquid refrigerant accumulated in the accumulator 12 also decreases. Consequently, the liquid refrigerant flowing out from the accumulator 12 decreases, or the liquid refrigerant scarcely flows outside. Therefore, the refrigerant to be sucked into the compressor 2 due to influence of ambient heat gains the superheat degree SH, and the discharge refrigerant temperature Td heightens up to about +105° C. (shown with Td in FIG. 5) even at the same suction refrigerant temperature Ts (Ts=−10° C. of the line L2 in FIG. 5).

Figure 5:
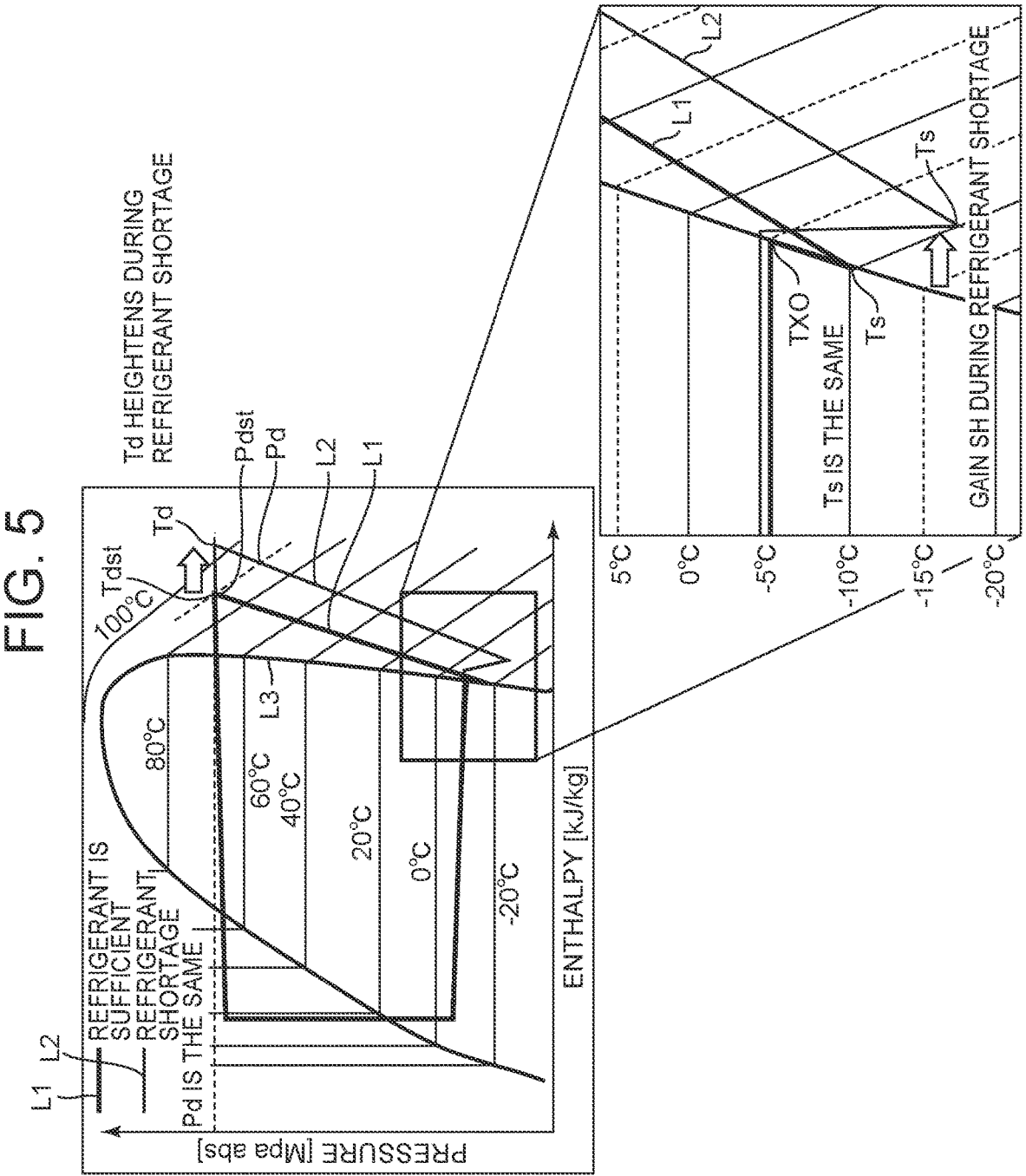
FIG. 5 is a P-h graph in the heating mode of the vehicle air conditioning device of FIG. 1.

Thus, in this example, the controller 32 possesses normal time data indicating a relation between the suction refrigerant temperature Ts and the discharge refrigerant temperature Td of the compressor 2 at normal time when the refrigerant circuit R is charged with the sufficient amount of the refrigerant, and the controller calculates, from this normal time data, a discharge refrigerant temperature estimated value Tdst (Tdst is shown in FIG. 5) that is the estimated value of the discharge refrigerant temperature Td at the normal time on the basis of the current suction refrigerant temperature Ts, and the controller 32 compares this discharge refrigerant temperature estimated value Tdst and the current discharge refrigerant temperature Td (Td is shown in FIG. 5), thereby judging the refrigerant shortage of the refrigerant circuit R.

(7-1) Normal Time Data

In the embodiment, this normal time data is a multiple regression equation in which the above discharge refrigerant temperature estimated value Tdst is considered as an objective variable, and the suction refrigerant temperature Ts and the discharge refrigerant pressure Pd are considered as explanatory variables. This multiple regression equation of the embodiment is given by Equation (I) as follows.

$$Tdst = A*Pd + B*Ts + C \qquad (I),$$

in which A and B are partial regression coefficients and C is a constant. The controller 32 substitutes the current suction refrigerant temperature Ts and the current discharge refrigerant pressure Pd into Equation (I), thereby calculating the discharge refrigerant temperature estimated value Tdst that is the estimated value of the discharge refrigerant temperature Td at the normal time.

Figure 6:
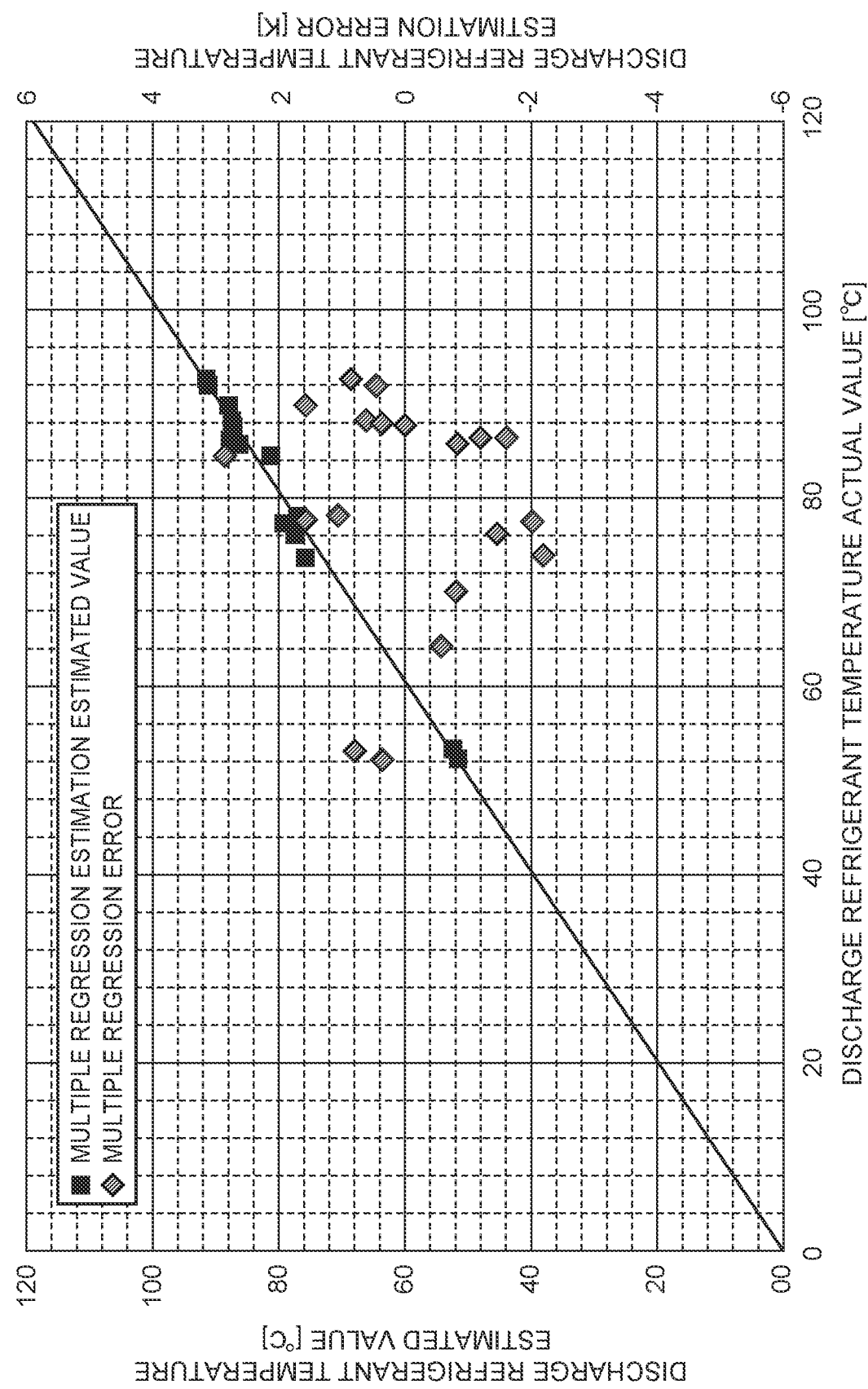
FIG. 6 is a diagram showing a multiple regression estimation estimated value and a multiple regression error in the heating mode.
Figure 7:
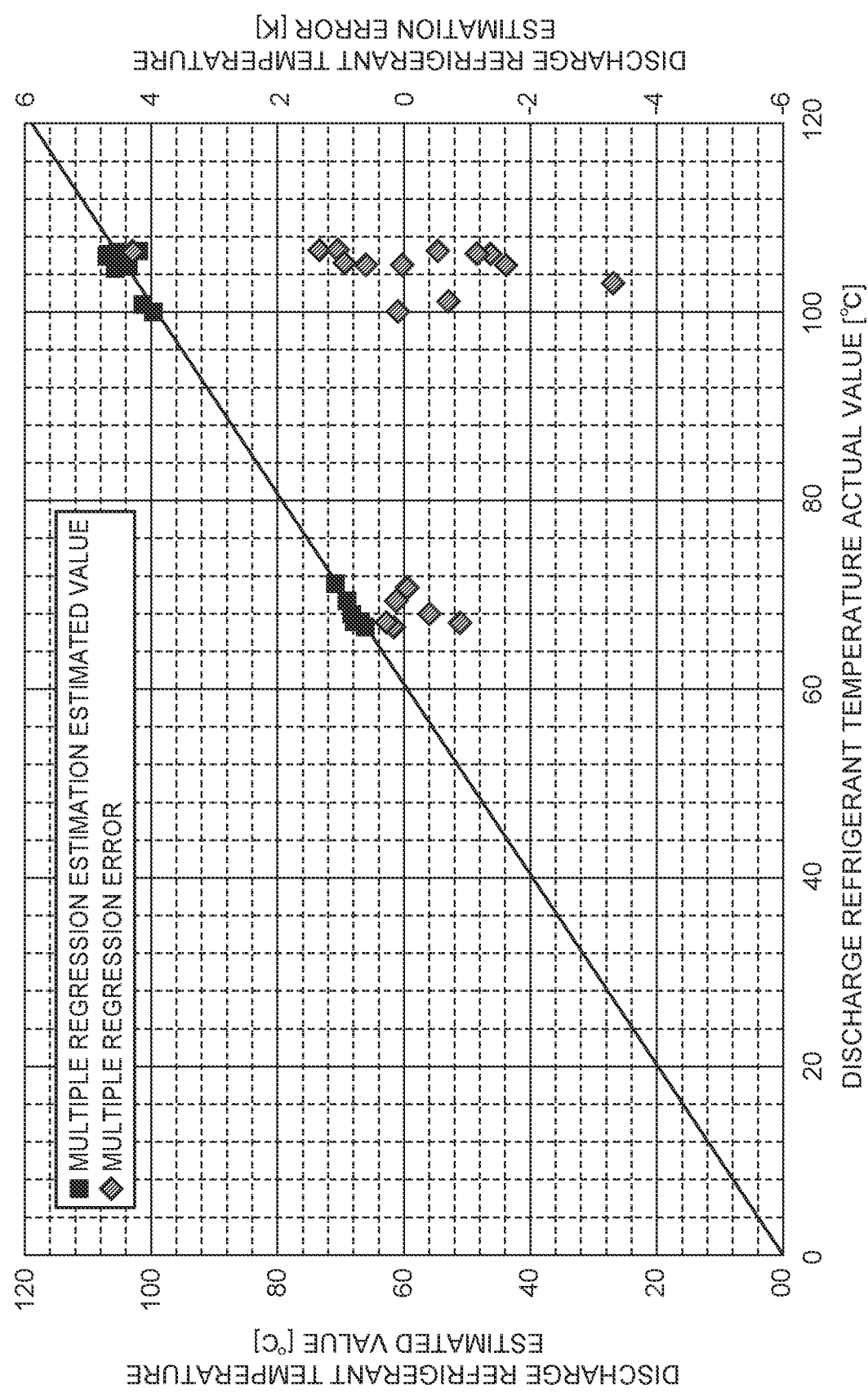
FIG. 7 is a diagram showing a multiple regression estimation estimated value and a multiple regression error in a mode other than the heating mode.

FIG. 6 shows a diagram in which an ordinate represents the discharge refrigerant temperature estimated value Tdst (a multiple regression estimation estimated value) calculated as described above and an abscissa represents the actual discharge refrigerant temperature Td (a discharge refrigerant temperature actual value), and shows a discharge refrigerant temperature estimation error (a multiple regression error) that is an error between both the values. In this drawing, when the multiple regression estimation estimated value is present on an obliquely straight line, the error is zero. In this case, the calculated multiple regression estimation estimated value slightly deviates from this obliquely straight line, but the error between both the values (the multiple regression error) is within a predetermined tolerance. It can be judged that the data is sufficiently usable. Furthermore, FIG. 7 shows cooling system conditions other than the above heating conditions (an operation mode other than the heating mode). Also in this case, a multiple regression error is within the predetermined tolerance, and it is seen that the data is sufficiently usable.

(7-2) Judgment of Suspicion of Refrigerant Shortage

The controller 32 compares the discharge refrigerant temperature estimated value Tdst calculated as described above and the current discharge refrigerant temperature Td. For example, when the current discharge refrigerant temperature Td is higher than the discharge refrigerant temperature estimated value Tdst+$\alpha$ (e.g., 10 K or the like), i.e., when (Tdst+$\alpha$)<Td, it is judged that there is suspicion of the refrigerant shortage of the refrigerant circuit R (a refrigerant shortage suspicion flag is set).

(7-3) Determination of Occurrence of Refrigerant Shortage (No. 1)

When it is judged that there is the suspicion of the refrigerant shortage of the refrigerant circuit R as described above, the controller 32 decreases an upper limit of the number of revolution NC of the compressor 2 (e.g., decreases from 8000 rpm as usual down to 3000 rpm or the like) in the embodiment, to lower a capability of the compressor 2. In this state, the controller again calculates the discharge refrigerant temperature estimated value Tdst and, in turn, judges whether or not the current discharge refrigerant temperature Td is higher than the discharge refrigerant temperature estimated value Tdst+$\beta$ (e.g., 15 K or the like) which has a difference much larger than the above difference ($\alpha$<$\beta$). Then, when (Tdst+$\beta$)<Td, the controller 32 determines the occurrence of the refrigerant shortage of the refrigerant circuit R. When the occurrence of the refrigerant shortage is determined, the controller 32 decreases the number of revolution NC of the compressor 2 down to, for example, a minimum number of revolution of controlling, or stops the compressor, and also displays the occurrence of the refrigerant shortage in the air conditioning operating portion 53 to notify a user (a notifying operation). Consequently, while protecting the compressor 2, the controller warns the user of the occurrence of the refrigerant shortage, thereby encouraging rapid response. It is to be noted that, for example, when (Tdst+$\beta$)<Td is not established within a predetermined time after the capability of the compressor 2 is lowered, the controller 32 cancels the suspicion of the refrigerant shortage (resets the refrigerant shortage suspicion flag).

In this way, the controller 32 possesses the normal time data indicating the relation between the suction refrigerant temperature Ts and the discharge refrigerant temperature Td of the compressor 2 at the normal time when the refrigerant circuit R is charged with the sufficient amount of the refrigerant, and the controller 32 calculates, from this normal time data, the discharge refrigerant temperature estimated value Tdst that is the estimated value of the discharge refrigerant temperature Td at the normal time on the basis of the current suction refrigerant temperature Ts, and compares this discharge refrigerant temperature estimated value Tdst and the current discharge refrigerant temperature Td, thereby judging the shortage refrigerant of the refrigerant circuit R. Consequently, when the refrigerant gradually leaks from the refrigerant circuit R or when the amount of the refrigerant enclosed in the refrigerant circuit R during services or the like is small, it is possible to detect the occurrence of the refrigerant shortage early.

In this case, the normal time data is considered as the multiple regression equation in which the discharge refrigerant temperature estimated value Tdst is considered as an objective variable, and the suction refrigerant temperature Ts and the discharge refrigerant pressure Pd are considered as explanatory variables, and the discharge refrigerant temperature estimated value Tdst is obtained from the current suction refrigerant temperature Ts and the discharge refrigerant pressure Pd in the multiple regression equation. Consequently, it is possible to accurately calculate the discharge refrigerant temperature estimated value Tdst.

Furthermore, when it is judged that there is the suspicion of the refrigerant shortage of the refrigerant circuit R, the controller 32 decreases the upper limit of the number of revolution NC of the compressor 2 to lower the capability of the compressor 2. Consequently, it is possible to perform protection before the compressor 2 rushes into a region where there is possibility of its failure, and it is also possible to notify the user of the suspicion of the refrigerant shortage, while previously avoiding the disadvantage that the compressor 2 is seriously damaged.

Then, the controller 32 lowers the capability of the compressor 2, and then determines the occurrence of the refrigerant shortage of the refrigerant circuit R on conditions that a difference between the discharge refrigerant temperature estimated value Tdst and the current discharge refrigerant temperature Td increases (the difference $\alpha$ is enlarged to the difference $\beta$). Consequently, it is possible to highly accurately detect the occurrence of the refrigerant shortage of the refrigerant circuit R by two stages of judgments.

(7-4) Determination of Occurrence of Refrigerant Shortage (No. 2)

Here, description is made as to another example of a determining operation of the occurrence of the refrigerant shortage of the refrigerant circuit R by the controller 32. In this example, when it is judged that there is the suspicion of the refrigerant shortage of the refrigerant circuit R, the controller 32 narrows down a used bandwidth of the number of revolution NC of the compressor 2. For example, the controller adjusts the number of revolution NC of the compressor 2 to a constant low value (3000 rpm or the like). Consequently, it is possible to perform the protection before the compressor 2 rushes into the region where there is the possibility of its failure, and it is also possible to notify the user of the suspicion of the refrigerant shortage, while previously avoiding the disadvantage that the compressor 2 is seriously damaged.

Next, in a state where the used bandwidth of the number of revolution NC of the compressor 2 is narrowed down (the number of revolution is constant in the embodiment), the controller again compares the discharge refrigerant temperature estimated value Tdst and the current discharge refrigerant temperature Td, and determines the occurrence of the refrigerant shortage of the refrigerant circuit R. In this case, the controller 32 determines the occurrence of the refrigerant shortage of the refrigerant circuit R while the difference between the discharge refrigerant temperature estimated value Tdst and the current discharge refrigerant temperature Td is smaller (the difference is, for example, 5 K or the like, and $\gamma$: (Tdst+$\gamma$)<Td) ($\gamma$<$\alpha$). That is, also in this case, the controller performs two stages of judgments, narrows down the used bandwidth of the number of revolution NC of the compressor 2, and decreases the difference ($\gamma$). Consequently, it is possible to highly accurately and rapidly detect the occurrence of the refrigerant shortage of the refrigerant circuit R with high sensitivity. Furthermore, the controller similarly decreases the number of revolution NC of the compressor 2 down to, for example, the minimum number of revolution of controlling, or stops the compressor, and displays the occurrence of the refrigerant shortage in the air conditioning operating portion 53 to notify the user (the notifying operation).

(8) Judgment of Refrigerant Shortage by Controller 32 (No. 2)

In the judgment of the refrigerant shortage (No. 1) of the above (7), the controller compares the discharge refrigerant temperature Td of the compressor 2 and the discharge refrigerant temperature estimated value Tdst that is the estimated value of the discharge refrigerant temperature Td at the normal time, thereby judging the refrigerant shortage of the refrigerant circuit R, but the present invention is not limited thereto. As shown by a broken line in FIG. 5, the discharge refrigerant pressure Pd lowers at the same discharge refrigerant temperature Td. Therefore, the controller may compare the discharge refrigerant pressure Pd of the compressor 2 and the discharge refrigerant pressure estimated value Pdst at the normal time to perform the judgment. That is, when the refrigerant shortage occurs at the same suction refrigerant temperature Ts and the same discharge refrigerant temperature Td, the discharge refrigerant pressure Pd changes so as to lower.

Thus, in this example, the controller 32 possesses normal time data indicating a relation between the suction refrigerant temperature Ts and the discharge refrigerant pressure Pd of the compressor 2 at the normal time when the refrigerant circuit R is charged with the sufficient amount of the refrigerant, and the controller calculates, from this normal time data, a discharge refrigerant pressure estimated value Pdst (Pdst is shown in FIG. 5) that is the estimated value of the discharge refrigerant pressure Pd at the normal time on the basis of the current suction refrigerant temperature Ts, and the controller 32 compares this discharge refrigerant pressure estimated value Pdst and the current discharge refrigerant pressure Pd (Pd is shown in FIG. 5), thereby judging the refrigerant shortage of the refrigerant circuit R.

(8-1) Normal Time Data

The normal time data also in this case is a multiple regression equation in which in the embodiment, the above discharge refrigerant pressure estimated value Pdst is considered as an objective variable, and the suction refrigerant temperature Ts and the discharge refrigerant temperature Td are considered as explanatory variables. This multiple regression equation of this embodiment is given by Equation (II) as follows.

$$Pdst = D*Td + E*Ts + F \quad (II),$$

in which D and E are partial regression coefficients and F is a constant. The controller 32 substitutes the current suction refrigerant temperature Ts and the current discharge refrigerant temperature Td into Equation (II), thereby calculating the discharge refrigerant pressure estimated value Pdst that is the estimated value of the discharge refrigerant pressure Pd at the normal time.

(8-2) Judgment of Suspicion of Refrigerant Shortage

The controller 32 compares the discharge refrigerant pressure estimated value Pdst calculated as described above and the current discharge refrigerant pressure Pd. For example, when the current discharge refrigerant pressure Pd is lower than the discharge refrigerant pressure estimated value Pdst−α, i.e., when (Pdst−α)>Pd, it is judged that there is suspicion of the refrigerant shortage of the refrigerant circuit R (a refrigerant shortage suspicion flag is set).

(8-3) Determination of Occurrence of Refrigerant Shortage (No. 1)

When it is judged that there is the suspicion of the refrigerant shortage of the refrigerant circuit R as described above, for example, the controller 32 decreases the upper limit of the number of revolution NC of the compressor 2 (e.g., decreases from 8000 rpm as usual down to 3000 rpm or the like), to lower the capability of the compressor 2. In this state, the controller calculates the discharge refrigerant pressure estimated value Pdst again and, in turn, judges whether or not the current discharge refrigerant pressure Pd is lower than the discharge refrigerant pressure estimated value Pdst−β which has a difference much larger than the above difference (α<β). Then, when (Pdst−β)>Pd, the controller 32 determines the occurrence of the refrigerant shortage of the refrigerant circuit R. When the occurrence of the refrigerant shortage is determined, the controller 32 decreases the number of revolution NC of the compressor 2 down to, for example, the minimum number of revolution of controlling, or stops the compressor, and also displays the occurrence of the refrigerant shortage in the air conditioning operating portion 53 to notify the user (the notifying operation). Consequently, while protecting the compressor 2, the controller warns the user of the occurrence of the refrigerant shortage, thereby encouraging the rapid response. It is to be noted that, for example, when (Pdst−β)>Pd is not established within a predetermined time after the capability of the compressor 2 is lowered, the controller 32 cancels the suspicion of the refrigerant shortage (resets the refrigerant shortage suspicion flag).

In this way, the controller 32 possesses the normal time data indicating the relation between the suction refrigerant temperature Ts and the discharge refrigerant pressure Pd of the compressor 2 at the normal time when the refrigerant circuit R is charged with the sufficient amount of the refrigerant, and the controller 32 calculates, from this normal time data, the discharge refrigerant pressure estimated value Pdst that is the estimated value of the discharge refrigerant pressure Pd at the normal time on the basis of the current suction refrigerant temperature Ts, and compares this discharge refrigerant pressure estimated value Pdst and the current discharge refrigerant pressure Pd, thereby judging the refrigerant shortage of the refrigerant circuit R. Similarly, when the refrigerant gradually leaks from the refrigerant circuit R or when the amount of the refrigerant enclosed in the refrigerant circuit R during the services or the like is small, it is possible to detect the occurrence of the refrigerant shortage early.

In this case, the normal time data is considered as the multiple regression equation in which the discharge refrigerant pressure estimated value Pdst is considered as an objective variable, and the suction refrigerant temperature Ts and the discharge refrigerant temperature Td are considered as explanatory variables, and the discharge refrigerant pressure estimated value Pdst is obtained from the current suction refrigerant temperature Ts and the discharge refrigerant temperature Td in the multiple regression equation. Consequently, it is possible to accurately calculate the discharge refrigerant pressure estimated value Pdst.

Furthermore, when it is judged that there is the suspicion of the refrigerant shortage of the refrigerant circuit R, the controller 32 decreases the upper limit of the number of revolution NC of the compressor 2, to lower the capability of the compressor 2. Consequently, it is possible to perform the protection before the compressor 2 rushes into the region where there is the possibility of its failure, and it is also possible to notify the user of the suspicion of the refrigerant shortage, while previously avoiding the disadvantage that the compressor 2 is seriously damaged.

Then, the controller 32 lowers the capability of the compressor 2, and then determines the occurrence of the refrigerant shortage of the refrigerant circuit R on conditions that a difference between the discharge refrigerant pressure estimated value Pdst and the current discharge refrigerant pressure Pd increases (the difference α is enlarged to the difference β). Consequently, it is similarly possible to highly accurately detect the occurrence of the refrigerant shortage of the refrigerant circuit R by two stages of judgments.

(8-4) Determination of Occurrence of Refrigerant Shortage (No. 2)

Also in this case, when it is similarly judged that there is the suspicion of the refrigerant shortage of the refrigerant circuit R, the controller 32 may narrow down the used bandwidth of the number of revolution NC of the compressor 2. Furthermore, in a state where the used bandwidth of the number of revolution NC of the compressor 2 is narrowed down (the number of revolution is constant in the embodiment), the controller may again compare the discharge refrigerant pressure estimated value Pdst and the current discharge refrigerant pressure Pd and determines the occurrence of the refrigerant shortage of the refrigerant circuit R. Also in this case, the controller 32 determines the occurrence of the refrigerant shortage of the refrigerant circuit R while a difference between the discharge refrigerant pressure estimated value Pdst and the current discharge refrigerant pressure Pd is smaller (the difference γ: (Pdst−γ)>Pd) (γ<α). Specifically, also in this case, the controller performs the judgments of two stages, narrows down the used bandwidth of the number of revolution NC of the compressor 2, and decreases the difference, so that it is possible to highly accurately and rapidly detect the occurrence of the refrigerant shortage of the refrigerant circuit R with high sensitivity. Furthermore, the controller similarly decreases the number of revolution NC of the compressor 2 down to the minimum number of revolution of controlling, or stops the compressor, and displays the occurrence of the refrigerant shortage in the air conditioning operating portion 53, thereby notifying the user (the notifying operation).

Embodiment 2

Figure 8:
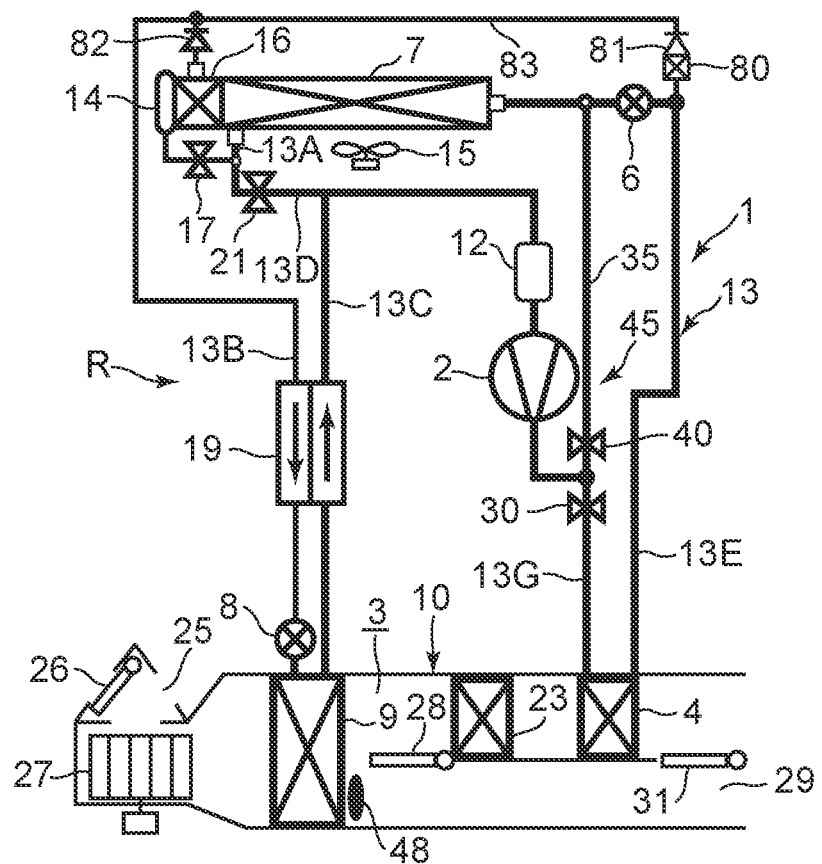
FIG. 8 is a constitutional view of a vehicle air conditioning device of another embodiment of the present invention (Embodiment 2).

Next, FIG. 8 shows a constitutional view of a vehicle air conditioning device 1 of another embodiment to which the present invention is applied. It is to be noted that in this drawing, components denoted with the same reference numerals as in FIG. 1 or FIG. 3 exhibit the same or similar functions. In this embodiment, an outlet of a subcooling portion 16 is connected to a check valve 82, and an outlet of the check valve 82 is connected to a refrigerant pipe 13B. It is to be noted that a refrigerant pipe 13B (an indoor expansion valve 8) side of the check valve 82 is considered as a forward direction.

Furthermore, a refrigerant pipe 13E on an outlet side of a radiator 4 branches before an outdoor expansion valve 6, and this branching refrigerant pipe (hereinafter referred to as a second bypass pipe) 83 communicates and connects with the refrigerant pipe 13B on a downstream side of the check valve 82 via the solenoid valve 80 (for dehumidifying) and the check valve 81. It is to be noted that a refrigerant pipe 13B side of the check valve 82 is considered as a forward direction. Then, the solenoid valve 80 is also connected to an output of a controller 32. The other components are similar to those of the above-mentioned embodiment of FIG. 1 or FIG. 3, and description thereof is omitted.

Description will be made as to an operation of the vehicle air conditioning device 1 of this embodiment having the above constitution. Also in this embodiment, the controller 32 switches between and executes respective operation modes of a heating mode, a dehumidifying and heating mode, a dehumidifying and cooling mode, a cooling mode and a MAX cooling mode (a maximum cooling mode). It is to be noted when the heating mode, the dehumidifying and cooling mode, the cooling mode or the MAX cooling mode is selected, an operation and a refrigerant flows are similar to those of the above embodiment (Embodiment 1). However, in this embodiment (Embodiment 2), the solenoid valve 80 is closed in these heating mode, dehumidifying and cooling mode, cooling mode and MAX cooling mode.

(9) Dehumidifying and Heating Mode of Vehicle Air Conditioning Device 1 of FIG. 8

On the other hand, when the dehumidifying and heating mode is selected, the controller 32 in this embodiment (Embodiment 2) opens a solenoid valve 21 (for heating) and closes a solenoid valve 17 (for cooling). Furthermore, the controller opens a solenoid valve 30 (for dehumidifying), and closes a solenoid valve 40 (for the dehumidifying). Furthermore, the controller 32 opens the solenoid valve 80 (for the dehumidifying). Then, the controller operates a compressor 2 and respective blowers 15 and 27, and an air mix damper 28 achieves a state of sending, to an auxiliary heater 23 and the radiator 4, all the air in an air flow passage 3 that is blown out from the indoor blower 27 and passed through a heat absorber 9.

In consequence, a high-temperature high-pressure gas refrigerant discharged from the compressor 2 flows into the radiator 4 through the solenoid valve 30 and a refrigerant pipe 13G. The air in the air flow passage 3 passes through the radiator 4, and hence the air in the air flow passage 3 heats by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into an outdoor heat exchanger 7. The refrigerant flowing into the outdoor heat exchanger 7 evaporates, and the heat is pumped up from the outdoor air passed by running or the outdoor blower 15. In other words, a refrigerant circuit R functions as a heat pump. Then, the low-temperature refrigerant flowing out from the outdoor heat exchanger 7 flows through a refrigerant pipe 13A, the solenoid valve 21 and a refrigerant pipe 13D, and flows from a refrigerant pipe 13C into an accumulator 12 to perform gas-liquid separation therein, and then the gas refrigerant is sucked into the compressor 2, thereby repeating this circulation.

Furthermore, a part of the condensed refrigerant flowing through the radiator 4 and the refrigerant pipe 13E is distributed, and this part of the refrigerant flows through the solenoid valve 80, a check valve 81, the second bypass pipe 83, the refrigerant pipe 13B and an internal heat exchanger 19 to reach the indoor expansion valve 8. The refrigerant is decompressed in the indoor expansion valve 8 and then flows into the heat absorber 9 to evaporate. By a heat absorbing operation at this time, water in the air blown out from the indoor blower 27 coagulates to adhere to the heat absorber 9, and hence the air is cooled and dehumidified.

The refrigerant evaporated in the heat absorber 9 flows through the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls a number of revolution of the compressor 2 on the basis of a high pressure of the refrigerant circuit R which is detected by a discharge pressure sensor 42 or a radiator pressure sensor 47, and controls a valve position of the outdoor expansion valve 6 on the basis of a temperature of the heat absorber 9 which is detected by a heat absorber temperature sensor 48.

Also in the vehicle air conditioning device 1 of this embodiment, the controller 32 executes operation of judging suspicion of the refrigerant shortage and determining occurrence of the refrigerant shortage as described above in (7) and (8). Consequently, when a refrigerant gradually leaks from the refrigerant circuit R or when an amount of the refrigerant enclosed in the refrigerant circuit R during services or the like is small, it is possible to detect the occurrence of the refrigerant shortage early.

It is to be noted that in the embodiment, the controller compares a discharge refrigerant temperature estimated value Tdst and a discharge refrigerant temperature Td, or compares a discharge refrigerant pressure estimated value Pdst and a discharge refrigerant pressure Pd, to thereby obtain a difference between both the temperatures or pressures. However, the present invention is not limited thereto. The controller may obtain a ratio therebetween as a result of the comparison, and judge the occurrence of the refrigerant shortage of the refrigerant circuit R, for example, when the ratio Tdst/Td decreases or when the ratio Pdst/Pd increases.

Furthermore, in the embodiment, normal time data is a multiple regression equation in which the discharge refrigerant temperature estimated value Tdst is considered as an objective variable, and a suction refrigerant temperature Ts and the discharge refrigerant pressure Pd are considered as explanatory variables, or the normal time data is a multiple regression equation in which the discharge refrigerant pressure estimated value Pdst is considered as an objective variable, and a suction refrigerant temperature Ts and the discharge refrigerant temperature Td are considered as explanatory variables. However, the present invention is not limited thereto, and the normal time data may be an equation or map data indicating a relation of the suction refrigerant temperature Ts and the discharge refrigerant pressure Pd to the discharge refrigerant temperature Td at normal time when the refrigerant circuit is charged with a sufficient amount of the refrigerant, or an equation or map data indicating a relation of the suction refrigerant temperature Ts and the discharge refrigerant temperature Td to the discharge refrigerant pressure Pd at the normal time when the refrigerant circuit is charged with the sufficient amount of the refrigerant. Also in this case, it is possible to accurately calculate the discharge refrigerant temperature estimated value Tdst or the discharge refrigerant pressure estimated value Pdst. Thus, the multiple regression equation is used as in the embodiment, so that it is possible to further accurately calculate the discharge refrigerant temperature estimated value Tdst or the discharge refrigerant pressure estimated value Pdst.

Additionally, in the embodiment, the present invention has been described in the example where the controller switches between the heating mode, the dehumidifying and heating mode, the dehumidifying and cooling mode, the cooling mode and the MAX cooling mode, but the present invention is not limited thereto. The present invention is also effective for the vehicle air conditioning device which executes either one or any combination of the operation modes.

Furthermore, the present invention is not limited to the changing control of the respective operation modes described in the embodiments, and appropriate conditions may be set by employing one, any combination or all of parameters such as the outdoor air temperature Tam, the humidity of the vehicle interior, the target outlet temperature TAO, the radiator temperature TH, the target radiator temperature TCO, the heat absorber temperature Te, the target heat absorber temperature TEO, and the presence/absence of the requirement for the dehumidifying of the vehicle interior, in accordance with the capability and use environment of the vehicle air conditioning device.

Additionally, the auxiliary heating device is not limited to the auxiliary heater 23 described in the embodiments, and a heating medium circulating circuit which circulates a heating medium heated by a heater to heat air in an air flow passage, a heater core which circulates radiator water heated by an engine or the like may be utilized. Furthermore, the constitutions of the refrigerant circuit R which are described in the above respective embodiments are not limited thereto, and the constitutions are changeable without departing from the gist of the present invention.

DESCRIPTION OF REFERENCE NUMERALS

1 vehicle air conditioning device
2 compressor
3 air flow passage
4 radiator
6 outdoor expansion valve (a pressure reducing unit)
7 outdoor heat exchanger (a radiator or a heat absorber)
8 indoor expansion valve (a pressure reducing unit)
9 heat absorber
17, 21, 30 and 40 solenoid valve
23 auxiliary heater (an auxiliary heating device)
27 indoor blower (a blower fan)
28 air mix damper
32 controller (a control device)
35 bypass pipe
44 suction pressure sensor
54 outdoor heat exchanger temperature sensor
55 suction temperature sensor
R refrigerant circuit

The invention claimed is:
1. A vehicle air conditioning device comprising a refrigerant circuit having a compressor to compress a refrigerant, a radiator to let the refrigerant radiate heat, a pressure reducing unit, and a heat absorber to let the refrigerant absorb heat, thereby conditioning air of a vehicle interior,
the vehicle air conditioning device comprising a control device to control the compressor,
wherein the control device possesses normal time data indicating a relation between a suction refrigerant temperature Ts and a discharge refrigerant temperature Td of the compressor at normal time when the refrigerant circuit is charged with a sufficient amount of the refrigerant, and
the control device calculates, from the normal time data, a discharge refrigerant temperature estimated value Tdst that is the estimated value of the discharge refrigerant temperature Td at the normal time on the basis of the current suction refrigerant temperature Ts, and
compares the discharge refrigerant temperature estimated value Tdst and the current discharge refrigerant temperature Td, thereby judging refrigerant shortage of the refrigerant circuit.
2. The vehicle air conditioning device according to claim 1, wherein the normal time data is data indicating a relation of the suction refrigerant temperature Ts and a discharge refrigerant pressure Pd of the compressor to the discharge refrigerant temperature Td at the normal time when the refrigerant circuit is charged with the sufficient amount of the refrigerant.

3. The vehicle air conditioning device according to claim 1, wherein the normal time data is a multiple regression equation in which the discharge refrigerant temperature estimated value Tdst is considered as an objective variable, and the suction refrigerant temperature Ts and the discharge refrigerant pressure Pd of the compressor are considered as explanatory variables.

4. The vehicle air conditioning device according to claim 1, wherein when judging the refrigerant shortage of the refrigerant circuit, the control device lowers a capability of the compressor.

5. The vehicle air conditioning device according to claim 4, wherein the control device lowers the capability of the compressor, and then determines occurrence of the refrigerant shortage of the refrigerant circuit on conditions that a difference between the discharge refrigerant temperature estimated value Tdst and the current discharge refrigerant temperature Td or a difference between the discharge refrigerant pressure estimated value Pdst and the current discharge refrigerant pressure Pd increases.

6. The vehicle air conditioning device according to claim 5, wherein when the occurrence of the refrigerant shortage of the refrigerant circuit is determined, the control device executes a predetermined notifying operation.

7. The vehicle air conditioning device according to claim 5, wherein when the occurrence of the refrigerant shortage of the refrigerant circuit is determined, the control device decreases the number of revolution NC of the compressor or stops the compressor.

8. The vehicle air conditioning device according to claim 1, wherein when judging the refrigerant shortage of the refrigerant circuit, the control device narrows down a used bandwidth of a number of revolution NC of the compressor, compares, again in this state, the discharge refrigerant temperature estimated value Tdst and the current discharge refrigerant temperature Td or compares the discharge refrigerant pressure estimated value Pdst and the current discharge refrigerant pressure Pd, and determines the occurrence of the refrigerant shortage of the refrigerant circuit.

9. The vehicle air conditioning device according to claim 8, wherein the used bandwidth of the number of revolution NC of the compressor is narrowed down, the control device determines the occurrence of the refrigerant shortage of the refrigerant circuit while a difference between the discharge refrigerant temperature estimated value Tdst and the current discharge refrigerant temperature Td or a difference between the discharge refrigerant pressure estimated value Pdst and the current discharge refrigerant pressure Pd is smaller.

10. A vehicle air conditioning device comprising a refrigerant circuit having a compressor to compress a refrigerant, a radiator to let the refrigerant radiate heat, a pressure reducing unit, and a heat absorber to let the refrigerant absorb heat, thereby conditioning air of a vehicle interior,
the vehicle air conditioning device comprising a control device to control the compressor,
wherein the control device possesses normal time data indicating a relation between a suction refrigerant temperature Ts and a discharge refrigerant pressure Pd of the compressor at normal time when the refrigerant circuit is charged with a sufficient amount of the refrigerant, and
the control device calculates, from the normal time data, a discharge refrigerant pressure estimated value Pdst that is the estimated value of the discharge refrigerant pressure Pd at the normal time on the basis of the current suction refrigerant temperature Ts, and
compares the discharge refrigerant pressure estimated value Pdst and the current discharge refrigerant pressure Pd, thereby judging refrigerant shortage of the refrigerant circuit.

11. The vehicle air conditioning device according to claim 10, wherein the normal time data is data indicating a relation of the suction refrigerant temperature Ts and a discharge refrigerant temperature Td of the compressor to the discharge refrigerant pressure Pd at the normal time when the refrigerant circuit is charged with the sufficient amount of the refrigerant.

12. The vehicle air conditioning device according to claim 10, wherein the normal time data is a multiple regression equation in which the discharge refrigerant pressure estimated value Pdst is considered as an objective variable, and the suction refrigerant temperature Ts and the discharge refrigerant temperature Td of the compressor are considered as explanatory variables.

* * * * *